(12) United States Patent
Garner et al.

(10) Patent No.: US 7,155,576 B1
(45) Date of Patent: Dec. 26, 2006

(54) PRE-FETCHING AND INVALIDATING PACKET INFORMATION IN A CACHE MEMORY

(75) Inventors: Trevor S. Garner, Apex, NC (US);
William R. Lee, Cary, NC (US);
Martin W. Hughes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 608 days.

(21) Appl. No.: 10/446,021

(22) Filed: May 27, 2003

(51) Int. Cl.
*G06F 12/00* (2006.01)
*G06F 15/16* (2006.01)

(52) U.S. Cl. .................. 711/137; 711/113; 711/133; 711/144; 711/145; 709/233; 709/234; 709/235

(58) Field of Classification Search ............... None
See application file for complete search history.

(56) References Cited

U.S. PATENT DOCUMENTS

| | | | |
|---|---|---|---|
| 5,016,162 A * | 5/1991 | Epstein et al. | 710/242 |
| 5,854,911 A * | 12/1998 | Watkins | 712/207 |
| 6,147,996 A | 11/2000 | Laor et al. | |
| 6,212,613 B1 | 4/2001 | Belair | |
| 6,286,084 B1 | 9/2001 | Wexler et al. | |
| 6,487,202 B1 | 11/2002 | Klausmeier et al. | |
| 6,650,640 B1 * | 11/2003 | Muller et al. | 370/392 |
| 6,868,458 B1 * | 3/2005 | Kim | 710/28 |
| 6,961,331 B1 * | 11/2005 | Tokunaga et al. | 370/352 |
| 6,993,633 B1 * | 1/2006 | Sakakibara et al. | 711/146 |
| 7,009,937 B1 * | 3/2006 | Miyamoto | 370/229 |

OTHER PUBLICATIONS

William Stallings, Data and Computer Communications, 2000, Prentice-Hall, pp. 394-411.*
Microsoft Computer Dictionary, 2002, Microsoft Press, p. 364.*
Am79C90 CMOS Local Area Network Controller for Ethernet, Publication No. 17881, Rev. C, Advanced Micro Devices Corporation, Sunnyvale, CA, Jan. 1998, pp. 1-61.

* cited by examiner

*Primary Examiner*—Reginald Bragdon
*Assistant Examiner*—Shawn Gu
(74) *Attorney, Agent, or Firm*—Cesari and McKenna LLP

(57) ABSTRACT

A technique for managing a cache memory coupled to an intermediate node's processor. Packets acquired by the intermediate node that are destined for processing by the processor are tracked, without the processor's intervention, to determine if the processor is lagging in processing the acquired packets. If so, data associated with unprocessed packets are pre-fetched from an external memory and placed in the cache memory without the processor's intervention. Moreover, packets destined for processing by the processor and placed into the cache memory are tracked, without the processor's intervention, to determine if the processor has, in fact, completed the processing of those packets. If so, data contained in the cache memory that is associated with the processed packets are invalidated, again without the processor's intervention.

39 Claims, 14 Drawing Sheets

PRE-FETCHING AND INVALIDATING PACKET INFORMATION IN A CACHE MEMORY

BACKGROUND OF THE INVENTION

1. Field of the Invention

The present invention relates to computer networking and specifically to pre-fetching and invalidating packet information held in a cache memory.

2. Background Information

A computer network is a geographically distributed collection of interconnected network links and segments for transporting data between nodes, such as computers. Many types of network segments are available, with the types ranging from local area networks (LANs) to wide area networks (WANs). End nodes, such as personal computers or workstations, typically communicate over the network by exchanging discrete frames or packets of data according to predefined protocols. In this context, a protocol consists of a set of rules defining how the nodes interact with each other.

Computer networks may be further interconnected by an intermediate node, such as a switch or router, having a plurality of ports which may be coupled to the networks. For example, a switch may be utilized to provide a "switching" function for transferring information between a plurality of LANs at high speed. The switching function includes receiving a data packet at a source port that originated from a source node and transferring that packet to at least one destination port for forwarding to a destination node.

A router may be used to interconnect LANs executing different LAN standards and/or to provide higher-level functionality than a switch. If the LAN standards associated with the source and destination nodes are dissimilar (e.g., Ethernet and token ring), the router may also alter the format of the packet so that it may be received by the destination node. Routers typically operate at the network layer of a communications protocol stack used by the network, such as the internetwork layer of the Transmission Control Protocol/Internet Protocol (TCP/IP) communications architecture.

Routers often perform various functions associated with modifying data (packets) transferred along a path from a source to a destination. These functions may include modifying information contained in a packet's layer-3 header. For example, an IP packet contains a time-to-live (TTL) field in its IP header. The TTL field indicates the number of "hops" a packet may take along a path before it is discarded. As the packet traverses a path from a source to a destination, each router along the path typically decrements the TTL field by one, determines if the field contains a zero, and, if so, discards the packet.

A router may employ one or more processors (CPUs) to modify packets processed by the router. Typically, a packet resides in a low-speed memory external to the processor (e.g., an external packet buffer) and the processor executes various instructions to access the packet and modify it, accordingly. In systems where the processor is significantly faster than the external memory, a high-speed memory, such as a cache memory, may be employed to enable faster access to the packet data and increase the router's capacity to process packets.

In a typical arrangement, the cache memory resides between the processor and the external memory, and comprises high-speed memory devices and logic configured to process memory requests containing operations (e.g., read data, write data) and addresses issued by the processor. The cache memory typically processes a request by determining if the data associated with the request is in the cache memory, and if so, performing the requested operation on the data in the cache memory. If the data is not present in the cache memory, the cache may acquire the data from the lower-speed external memory before performing the requested operation.

Requests involving read operations are typically performed by acquiring the data, as described above, and presenting the acquired data to the processor. The operation is usually considered complete when the data is presented to the processor. Requests that involve write operations may be processed differently depending on the configuration of the cache memory. For example, in a "write-back" cache memory configuration, the cache memory may simply acquire the cache data, as described above, and perform the write operation on the data in the cache memory. The operation is considered complete when the cache data has been modified. On the other hand, in a "write-through" cache configuration, the cache memory acquires the data, performs the operation on the data in the cache memory and writes the modified data back to the external memory. The operation does not complete until the data is actually written back to the external memory.

In some systems, multiple devices may have access to the data contained in the external memory. These systems may include coherency logic configured to maintain coherency between the data in the cache memory and the external memory. By doing so, data written by a device, such as a processor, is "seen" by the other devices that have access to the data, and vice-versa. For example, in a write-through cache configuration, the coherency logic may be configured to determine if a device other than the processor has written data to a memory location that is held in the processor's cache, and if so, invalidate the data in the processor's cache. In a write-back cache configuration, the coherency logic may be configured to determine if data written by the processor and held in the cache is being accessed by another device, and if so, write (flush) the data back to the external memory before the other device's request is processed.

Although a cache memory may increase a router's capacity to process packets, it may also act as a bottleneck to further increasing the router's packet processing capacity. For example, if the router's processor is faster than the cache, the processor may stall waiting for the cache memory to service its request, thus, limiting the processor's capacity to process packets. The processor may execute special instructions to, inter alia, pre-fetch data into the cache memory by acquiring the data from the external memory and placing the data into the cache memory before the processor uses the data; however, doing so often impacts the processor's performance. It should be noted that as used herein, "pre-fetching" relates to the technique of acquiring data from e.g., an external memory, before the processor needs the data.

Other problems associated with a cache memory may arise with having to maintain data coherency. For example, a router may employ data structures, such as transmit and receive descriptor rings, which enable the router's processor to send and receive packets to and from the network via a network interface. The descriptor rings often comprise one or more entries wherein each entry contains a pointer that references a memory location where a packet resides and an ownership bit that indicates ownership of the entry, i.e., whether the entry is "owned" by (exclusively accessible to) the network interface or the processor.

In a typical arrangement, when the network interface acquires a packet from the network it places the packet in an external memory at a location specified by a receive descriptor ring entry owned by the network interface. The network interface then changes the ownership of the entry to indicate the processor owns the entry, and notifies the processor that the packet has been placed in the external memory. The processor processes the packet which may include, e.g., retrieving data associated with the packet from the external memory, placing the retrieved data into its cache, modifying the packet data in the cache, placing the modified packet data from the cache back into the external memory, placing the location of the packet in a transmit descriptor ring entry owned by the processor, and setting the ownership of the entry to indicate the network interface owns the entry. The processor then typically invalidates the cache locations associated with the packet.

The processor may execute special pre-fetch instructions to retrieve the packet data from the external memory and place the data in the cache. However, this technique may be slow and time consuming and act to limit the processor's capacity to process packets and hence, the intermediate node's overall packet processing performance. Additionally, the processor may invalidate cache locations associated with the packets by executing special instructions that direct the cache to invalidate various locations within the cache. Likewise, execution of these special instructions can be taxing on the processor and may further act to limit the processor's capacity to process packets, and hence, the intermediate node's overall packet processing performance.

SUMMARY OF THE INVENTION

The present invention relates to a technique for improving the performance of a cache memory coupled to a processor of an intermediate node by pre-fetching data into and invalidating cache entries contained in the cache memory, without involving the processor. According to the technique, a check is performed, without the processor's intervention, to determine whether the processor is lagging in processing packets acquired by the intermediate node. The processor is considered lagging if there are any packets acquired by the intermediate node that are destined to be processed by the processor that have not yet been processed by the processor (i.e., unprocessed acquired packets). If the processor is not lagging, no action is taken. Otherwise, if the processor is lagging, data associated with unprocessed acquired packets are pre-fetched, again without the processor'intervention.

Moreover, packets processed by the processor whose associated data has been placed into the cache memory are, without the processor's intervention, tracked to determine if the processor has, in fact, completed the processing of those packets. If so, cache entries containing the data associated with the processed packets are invalidated, again without the processor's intervention.

In the illustrated embodiment, the processor and cache memory comprise a processor complex. In addition, the intermediate node is coupled to a network via a network interface and includes a high-speed descriptor ring memory containing transmit and receive descriptor ring data structures. Communication between the processor and the network interface is handled via transmit and receive descriptor ring entries contained in the transmit and receive descriptor rings, respectively. Moreover, entries in the transmit and receive descriptor rings are accessible by an index. The processor complex, an external (packet) memory, the network interface, and the descriptor ring memory are coupled to a system-on-a-chip (SoC) bus that is configured to enable the transfer of data among these components.

Pre-fetch logic circuitry and invalidate logic circuitry are also coupled to the SoC bus and are configured to pre-fetch data into the cache and invalidate entries in the cache, respectively, without involving the processor. The pre-fetch logic tracks the progress of the processor by monitoring accesses to the receive descriptor ring. If the network interface accesses a receive descriptor ring entry and changes the ownership bit of the entry to indicate the processor owns the entry, the pre-fetch logic updates a network interface index to the index of the entry accessed by the network interface. Likewise, if the processor accesses a receive descriptor ring entry and reads the content of the entry, the pre-fetch logic updates a processor index to the index of the entry accessed by the processor.

Using the network interface index and the processor index, the pre-fetch logic determines a difference that represents the number of packets received by the network interface that have not been processed by the processor (i.e., unprocessed packets). If the difference is greater than a predetermined maximum difference, the pre-fetch logic pre-fetches data associated with unprocessed acquired packets up to the maximum difference and places the data in the cache memory without the processor's intervention. If the number of unprocessed packets indicated by the difference is less than the maximum difference, the pre-fetch logic pre-fetches data associated with all the unprocessed packets and places the data in the cache memory, again, without the processor's intervention.

Upon the processing of a packet, the processor places an address associated with the packet in a transmit descriptor ring entry and changes the ownership of the entry to indicate the network interface owns the entry. The invalidate logic detects the change in the entry's ownership, concludes the processor has finished processing the packet associated with the entry, and invalidates cache entries in the cache memory containing the packet's data without the processor's intervention.

According to one aspect of the invention, the pre-fetch and invalidate logic circuitry function as (hardware) assist mechanisms that off-load data pre-fetch and invalidation operations from the processor. Advantageously, this aspect of the inventive technique improves performance of the cache memory and enhances the intermediate node's capacity to process packets.

Moreover, another aspect of the inventive technique limits the amount of data pre-fetched into the cache. This avoids over-filling the cache memory, which may cause a condition known as "cache thrashing." Cache thrashing occurs when previously pre-fetched data is replaced in the cache with current data before the previously pre-fetched data has been used by the processor.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN
ILLUSTRATIVE EMBODIMENT

Figure 1:
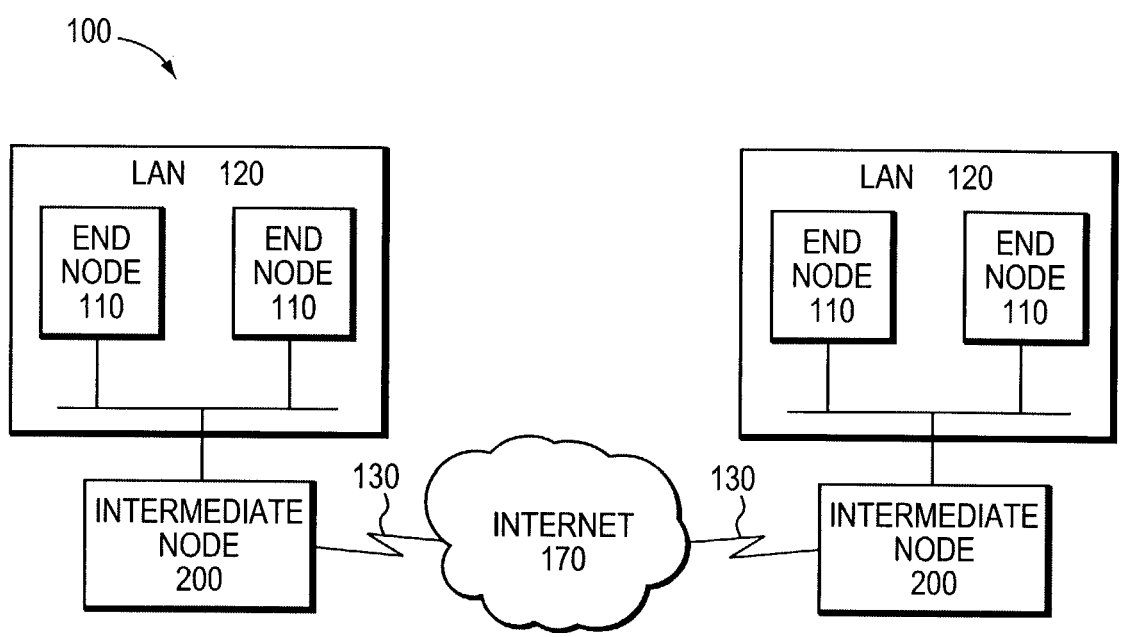
FIG. 1 is a schematic block diagram of a network that may be advantageously used with the present invention.

FIG. 1 is a schematic block diagram of a computer network 100 that may be advantageously used with the present invention. The computer network 100 comprises a collection of communication links and segments connected to a plurality of nodes, such as end nodes 110 and intermediate nodes 200. The network links and segments may comprise local area networks (LANs) 120, wide area networks (WANs), such as Internet 170, and WAN links 130 interconnected by intermediate nodes 200 to form an internetwork of computer nodes. These internetworked nodes communicate by exchanging data packets according to a predefined set of protocols, such as the Transmission Control Protocol/Internet Protocol (TCP/IP).

Figure 2:
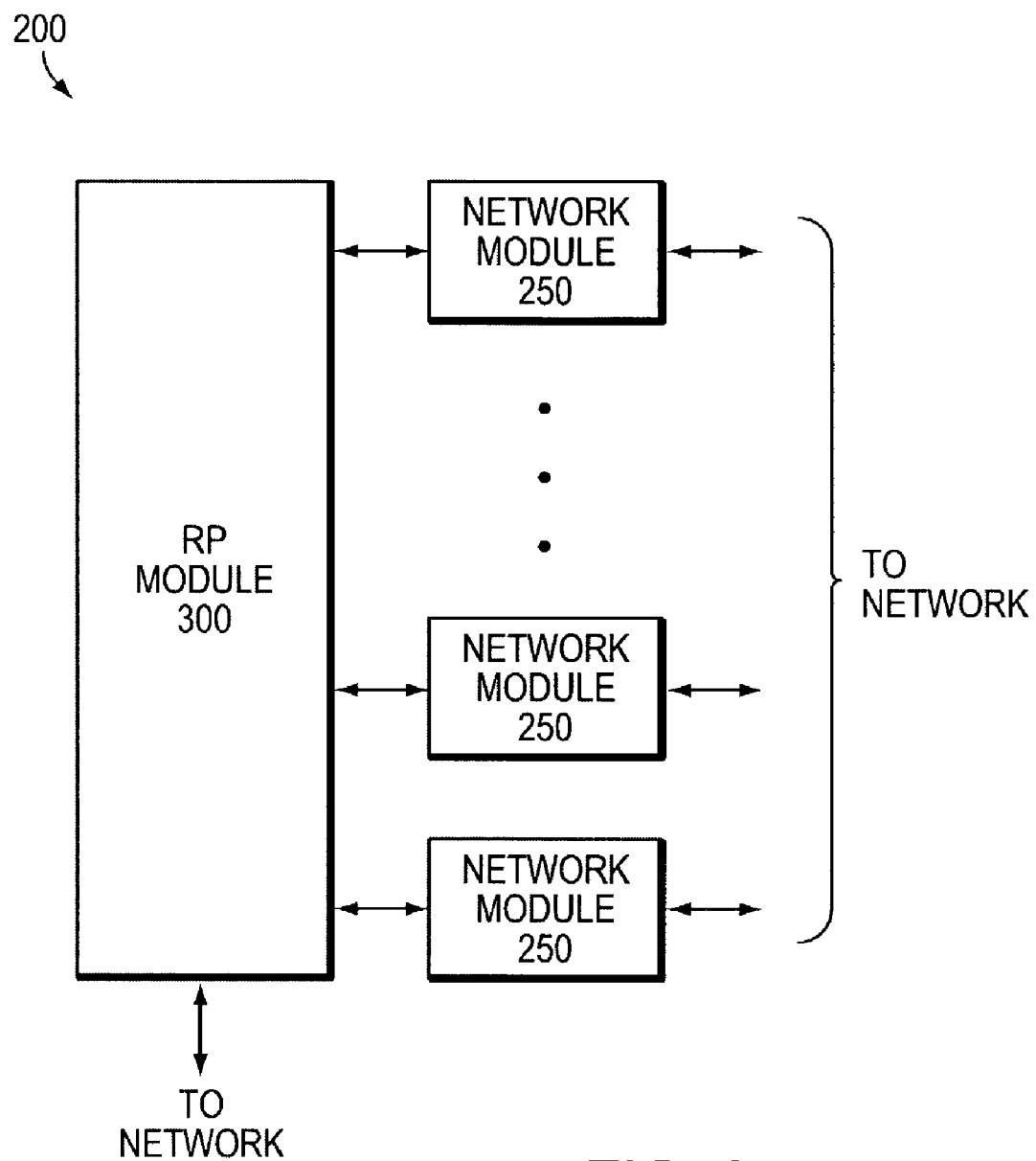
FIG. 2 is a high-level schematic block diagram of an exemplary intermediate node that may be advantageously used with the present invention.

FIG. 2 is a high-level schematic block diagram of intermediate node 200 that may be advantageously used with the present invention. A suitable intermediate node that may be used with the present invention is the Cisco 3700 Series Multiservice Access router available from Cisco Systems Incorporated, San Jose, Calif. Intermediate node 200 comprises one or more network modules 250 coupled to a route processor (RP) module 300. Node 200 is configured to perform, inter alia, various conventional switching and routing functions that support various combinations of communication protocols including, e.g., TCP/IP, Ethernet, Asynchronous Transfer Mode (ATM), and multi-channel T3.

Each network module 250 comprises logic that interfaces node 200 to the network. This logic may include, e.g., ATM, fast Ethernet (FE), and gigabit Ethernet (GE) ports, each of which includes conventional interface circuitry that may incorporate the signal, electrical and mechanical characteristics, and interchange circuits, needed to interface with the physical media and protocols running over that media.

Figure 3:
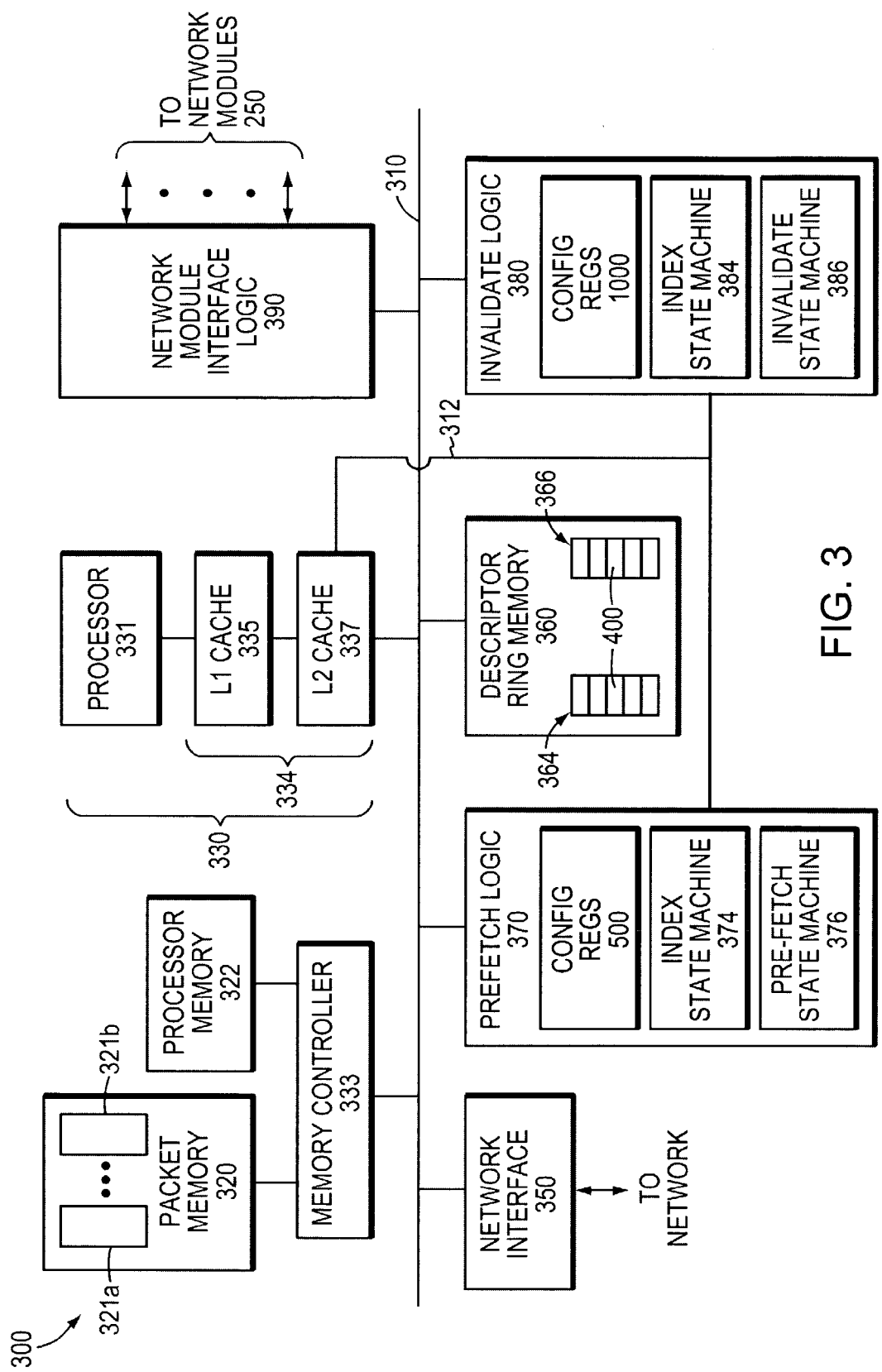
FIG. 3 is a partial schematic block diagram of a route processor module that may be advantageously used with the present invention.

RP module 300 comprises logic that is configured to, inter alia, manage node 200 and process various packets acquired by the network modules 250 and a network interface contained on the RP module 300. FIG. 3 is a partial schematic block diagram of RP module 300 comprising network module interface logic 390, various memories, a memory controller 333, a processor complex 330, the network interface 350, a descriptor ring memory 360, pre-fetch logic circuitry 370, and invalidate logic circuitry 380 interconnected via a system-on-a-chip (SoC) bus 310. It should be noted that although the descriptor ring memory 360 is illustrated as a separate device attached to the SoC bus 310, in other embodiments of the invention, memory 360 may be contained in a high-speed scratch-pad memory accessible to processor 331 and network interface 350, and contained within processor complex 330.

The SoC bus 310 is a conventional interconnect medium that enables devices (components) connected to the bus to communicate with one another. An example of a SoC bus that may be used is the processor local bus (PLB) available from International Business Machines, Corp. (IBM), White Plains, N.Y. The network module interface logic 390 comprises logic that interfaces the network modules 250 with the SoC bus 310 and enables data to be transferred between the network modules 250 and devices coupled to bus 310.

Processor memory 322 is illustratively a 64-megabyte (MB) random-access memory (RAM) comprising flash memory devices configured to hold, inter alia, data and computer executable instructions executed by processor 331. Packet memory 320 is a RAM configured to hold data packets, transferred to and from the network, in packet buffers 321. Illustratively, memory 320 comprises synchronous-dynamic RAM (SDRAM) devices capable of holding 256 megabytes of data. Processor memory 322 and packet memory 320 are coupled to memory controller 333 which comprises logic that enables devices coupled to the SoC bus 310 to access data (including instructions) contained in these memories.

Processor complex 330 comprises a processor 331 and a cache memory 334. Processor 331 contains logic that implements a conventional central-processing unit (CPU) configured to execute instructions that may access data contained in the various components coupled to the SoC bus 310. Illustratively, cache memory 334 comprises a 32-kilobyte (KB) level-one (L1) cache memory 335 and a 512-KB level-two (L2) cache memory 337, each having one or more 32-byte entries (cache entries) configured to hold various data (including data associated with packets contained in packet memory 320) and instructions accessed by processor 331. One skilled in the art would appreciate that the inventive technique could be applied to other cache memory configurations including a cache memory containing a single level.

Network interface 350 comprises logic that illustratively provides an Ethernet media access control (MAC) interface to the network. Descriptor ring memory 360 is illustratively a 64-KB high-speed static RAM (SRAM) accessible to processor 331 and network interface 350 and contains conventional transmit 366 and receive 364 descriptor ring data structures. Rings 364 and 366 are configured as conventional circular descriptor rings used by processor 331 and network interface 350 to transfer packets to and from the network. Each descriptor ring comprises one or more descriptor ring entries, wherein each entry is accessible by an index and is associated with a packet contained in a packet buffer 321.

Figure 4:
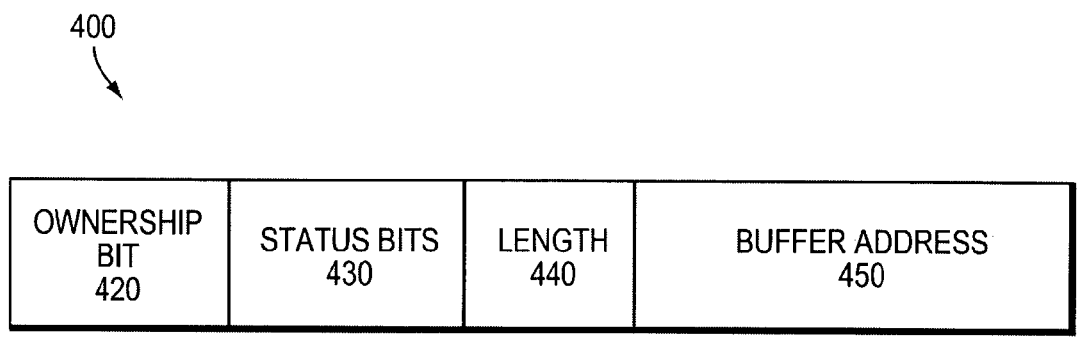
FIG. 4 is a schematic block diagram of a descriptor ring entry that may be advantageously used with the present invention.

FIG. 4 is a schematic block diagram of a descriptor ring entry 400 that may be advantageously used with the present invention. Entry 400 comprises an ownership bit field 420, a status bits field 430, a length field 440, and a buffer address field 450. The status bits field 430 holds various status bits associated with entry 400, which may include bits that indicate transmit/receive error status, start/end of packet, and so on. The buffer address field 450 holds an address that represents a location in the packet memory 320 of a packet buffer 321 associated with the entry 400. The length field 440 holds a value that represents the size of a packet contained in the associated packet buffer 321, illustratively in bytes.

The ownership bit field 420 is illustratively a one-bit field configured to hold an indicator that specifies whether the processor 331 or the network interface 350 owns the entry 400. For example in the case of an entry 400 in the transmit descriptor ring 366, if the indicator of the ownership bit field 420 is set to a one, the entry 400 is owned by the network interface 350 and if the indicator is set to zero, the entry 400 is owned by the processor 331. Conversely, for an entry 400 in the receive descriptor ring 364, if the indicator of the ownership bit field 420 is set to one, the entry 400 is owned by the processor 331 and if the indicator is set to zero, the entry 400 is owned by the network interface 350. Illustratively, a device (e.g., processor 331, network interface 350) that owns an entry 400 can access and use the information contained in or associated with the entry 400, whereas, a device that does not own an entry 400 does not access or use information contained in or associated with the entry 400.

Briefly, the buffer address fields 450 of the entries 400 in the read descriptor ring 364 are initialized by the processor 331 to contain values that represent addresses of packet buffers 321 in packet memory 320. The network interface 350 acquires a packet from the network and locates the next entry 400 in the receive descriptor ring 364 whose ownership bit 420 indicates the descriptor 400 is owned by the network interface 350. The network interface 350 (i) places the packet at the address represented by the content of the descriptor's buffer address field 450, (ii) places the packet's length in the descriptor'length field 440, (iii) changes the descriptor's ownership bit 420 to indicate the processor 331 has ownership of the entry, and (iv) notifies the processor 331 that a packet has been acquired.

Processor 331 processes the packet, which may include (i) accessing the receive descriptor ring entry 400 associated with the packet, (ii) using the buffer address 450 in the accessed entry 400 to locate the packet and acquire data associated with the packet, (iii) placing the acquired data in the cache memory 334, (iv) updating the packet by changing the data in the cache, (v) loading the updated packet into the packet memory 320, and (vi) transferring the packet onto the network via interface 350. The processor 331 transfers the packet onto the network by (i) determining the next entry 400 in the transmit descriptor ring 366 that is owned by the processor 331, (ii) placing the length of the packet in the entry's length field 440 and the packet's memory location in entry's buffer address field 450, and (iii) changing the ownership bit 420 in the entry to indicate the network interface 350 has ownership of the entry 400. The network interface 350 scans the transmit descriptor ring 366 searching for entries it owns, locates the entry 400, fetches the packet from the address specified by the buffer address field 440 of the entry 400, and transfers the packet onto the network.

The present invention relates to a technique for improving the performance of a cache memory coupled to a processor of an intermediate node by pre-fetching data into and invalidating cache entries contained in the cache memory, without involving the processor. According to the technique, a check is performed, without the processor's intervention, to determine if the processor is lagging in processing packets acquired by the intermediate node. The processor is considered lagging if there are any packets acquired by the intermediate node and destined to be processed by the processor that have not been processed by the processor (i.e., unprocessed acquired packets). If the processor is not lagging, no action is taken. Otherwise, if the processor is lagging, data associated with the unprocessed packets are pre-fetched, again without the processor's intervention, up to a predetermined maximum difference number of packets.

Moreover, acquired packets processed by the processor whose data has been placed into the cache memory are tracked, without the processor's intervention, to determine if the processor has, in fact, completed processing those packets. If so, cache entries containing the data are invalidated, again without the processor's intervention.

Pre-fetch logic 370 determines, without processor intervention, if the packet memory 320 holds unprocessed packets (i.e., determines if the processor is lagging). If so, pre-fetch logic 370 acquires data, associated with the unprocessed packets, from the packet memory 320 and places the data in the cache memory 334. Specifically, pre-fetch logic 370 monitors access to entries 400 in the receive descriptor ring 364 and determines a difference between the entry 400 accessed by the processor 331 and the entry 400 accessed by the network interface 350. This difference represents the number of packets acquired by the network interface 350 that have not been processed by the processor 331, i.e., the number of unprocessed packets. If the difference is greater than a pre-determined maximum difference, pre-fetch logic 370 acquires data, e.g., packet headers, associated with unprocessed packets from the packet memory 320 and places the data in the cache memory 334 for a number of packets up to the maximum difference ahead of the packet being currently being processed by the processor 331. Otherwise, if the difference is not greater than the maximum difference, pre-fetch logic 370 acquires data associated with unprocessed packets from the packet memory 320 and places the data in the cache memory 334 up to the number of packets acquired by the network interface 350. Illustratively, the data is acquired by issuing commands over bus 312 to the cache 334 that directs the cache 334 to pre-fetch the data and place the data in the cache 334.

For example, suppose pre-fetch logic 370 determines the entry 400 accessed by the processor 331 is the second entry 400 in ring 364 and the entry 400 accessed by the network device 350 is the seventh entry 400 in ring 364. Further suppose the predetermined maximum difference is three. The pre-fetch logic 370 determines that the difference between the next entries 400 in the read descriptor ring accessed by the processor 331 and the network device 350 is five, representing five unprocessed packets. Since there are unprocessed packets, logic 370 concludes the processor 331 is lagging. Moreover, since the number of unprocessed packets is greater than the maximum difference, logic 370 pre-fetches data associated with the unprocessed packets up to the maximum difference ahead of the packet currently being processed by the processor 331. Illustratively, pre-fetch logic 370 issues commands over bus 312 to the cache memory 334 to direct the cache 334 to pre-fetch the data associated with the unprocessed packets and place the data in the cache 334. Thus in the example, logic 370 issues commands to the cache memory 334 to direct the cache memory 334 to pre-fetch data associated with unprocessed packets represented by the third, fourth, and fifth read descriptor ring entries 400 and place the data in the cache memory 334.

Figure 5:
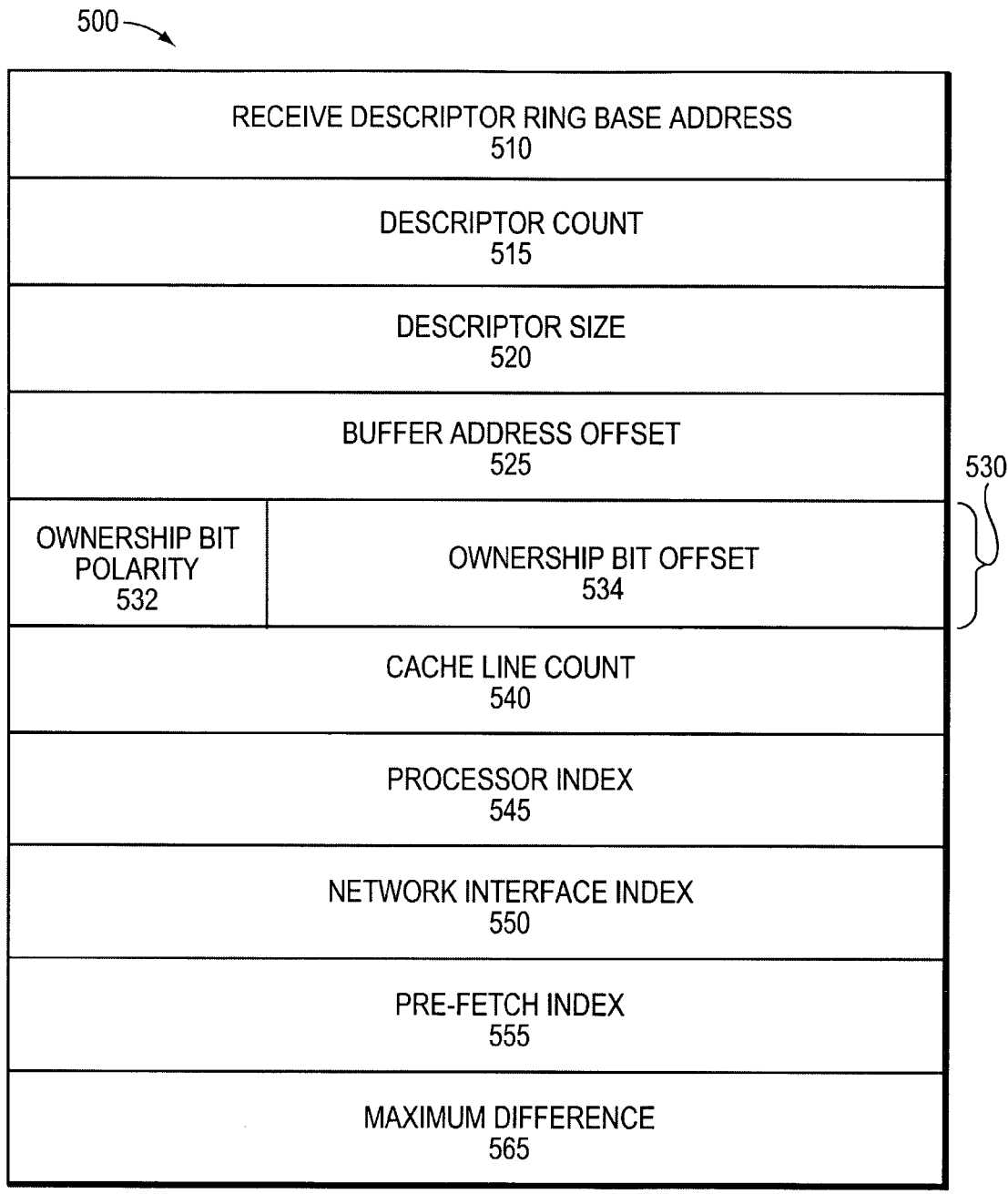
FIG. 5 is a schematic block diagram of configuration and control registers associated with pre-fetch logic that may be advantageously used with the present invention.

Logic 370 illustratively comprises an index state machine 374, a pre-fetch state machine 376, and configuration and control registers 500. State machines 374 and 376 contain combinatorial and sequential logic configured to implement conventional state machines. The configuration and control registers 500 contain logic configured to hold values that configure and control portions of the pre-fetch logic 370. FIG. 5 is a schematic block diagram of configuration and control registers 500 comprising a receive descriptor ring base address register 510, a descriptor count register 515, descriptor size register 520, and a buffer address offset register 525. The registers 500 further comprise, an ownership bit register 530, a cache line count register 540, a processor index register 545, a network interface index register 550, a pre-fetch index register 555, and a maximum difference register 565.

The receive descriptor ring base address register 510 holds a value that represents the base address of the receive descriptor ring 364. The descriptor count register 515 holds a value that indicates the number of entries 400 contained in receive descriptor ring 364 and the descriptor size register 520 holds a value that represents the size of each entry 400, illustratively in bytes. The buffer address offset register 525 holds a value that represents an offset, preferably in bytes, from the beginning of an entry 400 in the receive descriptor ring 364 where the buffer address field 450 begins.

The ownership bit register 530 holds information about the ownership bit contained in a receive descriptor ring entry 400. Specifically, register 530 contains an ownership bit offset field 534 that holds a value representing the offset of the ownership bit field 420, illustratively in bits, from the beginning of the entry 400. An ownership bit polarity field 532 holds a value that indicates the polarity of the ownership bit as it relates to the processor 331 owning the descriptor entry 400. For example, as noted above, the processor 331 illustratively owns a receive descriptor ring entry 400 if the ownership bit 420 contained in the entry 400 is set to a one; thus, the polarity value 532 is set to indicate a one.

The cache line count register 540 holds a value that indicates the amount of data pre-fetched by logic 370 from the packet memory 320. Preferably, register 540 holds a value that indicates the number of cache entries filled by the pre-fetch logic when pre-fetching data from the packet memory 320 and placing the data in the cache 334. The processor index 545 and network interface index 550 registers hold values that represent a processor index and network interface index, respectively. The processor index 545 and network index 550 are, illustratively, indices of entries 400 in the receive descriptor ring 364 of packets processed by the processor 331 and network interface 350, respectively. Illustratively, the processor index 545 is an index of the descriptor entry associated with the current packet being processed by the processor. Likewise, illustratively, the network interface index 550 is an index of the descriptor entry associated with the packet most recently acquired by the network interface 350. The pre-fetch index register 555 holds a pre-fetch index associated with the receive descriptor ring entry 400 accessed by the pre-fetch logic 370. The maximum difference register holds a "maximum difference" value that is used by the pre-fetch logic 370 to, inter alia, determine if data is pre-fetched from the packet memory 320 and placed in the cache 334 by the pre-fetch logic 370.

Figure 6:
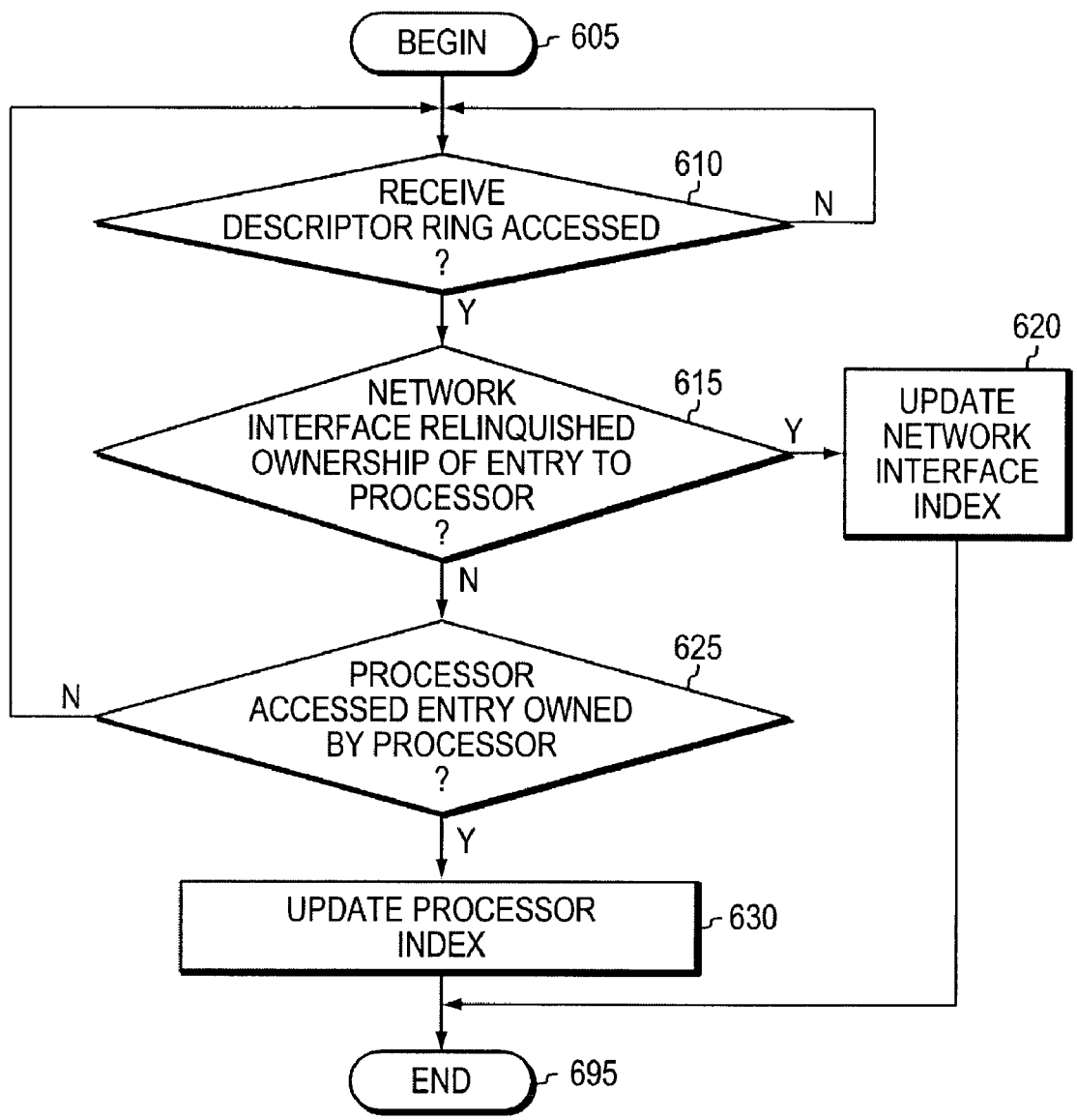
FIG. 6 is a flow diagram of a sequence of steps that may be advantageously used to update a network interface index and a processor index associated with pre-fetching data in accordance with the present invention.

Pre-fetch logic 370 updates the processor 545 and network interface index 550 registers by monitoring the SoC bus 310 for accesses to entries 400 in the receive descriptor ring 364 and adjusting the value of the appropriate index register to reflect the entry 400 accessed by the processor 331 and network interface 350. FIG. 6 is a flow diagram of a sequence of steps that may be used to update the contents of the processor 545 and network interface 550 index registers in accordance with the inventive technique. The sequence begins at Step 605 and proceeds to Step 610 where index state machine 374 determines if the receive descriptor ring 364 has been accessed. Specifically, state machine 374 monitors bus 310 to determine if an entry 400, contained in the address space defined by the combination of the contents of the receive descriptor ring base address 510, the descriptor count 515, and descriptor size 525 registers, has been accessed. If the receive descriptor ring 364 has not been accessed, the sequence returns to Step 610.

Otherwise, the sequence proceeds to Step 615 where the index state machine 374 determines if the network interface 350 has changed the ownership bit 420 of the accessed entry 400 to indicate the processor 331 has ownership of the entry 400. Specifically, the pre-fetch logic 370 determines if the network interface 350 has e.g., written the ownership bit 420 of the accessed entry 400. If so, using the ownership bit offset 534 and ownership bit polarity 532 information, the pre-fetch logic 370 determines if the value written in the ownership bit field 420 indicates the entry 400 is owned by the processor 331 (i.e., the network interface 350 has relinquished ownership of the entry 400 to the processor 331). If so, the sequence proceeds to Step 620 where the content of the network interface index register 550 is updated to contain the index of the descriptor entry 400 in the receive descriptor ring 364 that was accessed by the network interface 350.

Otherwise, if the network interface 350 has not changed the ownership of the accessed entry 400 to the processor 331, the sequence proceeds to Step 625 where the index state machine 374 determines if the processor 331 accessed the entry 400 by acquiring (e.g., reading) the content of the accessed entry 400. If not, the sequence returns to Step 610. Otherwise, the sequence proceeds to Step 630 where the content of the processor index register 545 is updated to contain the index of the entry 400 in the receive descriptor ring 364 accessed by the processor 331. The sequence ends at Step 695.

Figure 7:
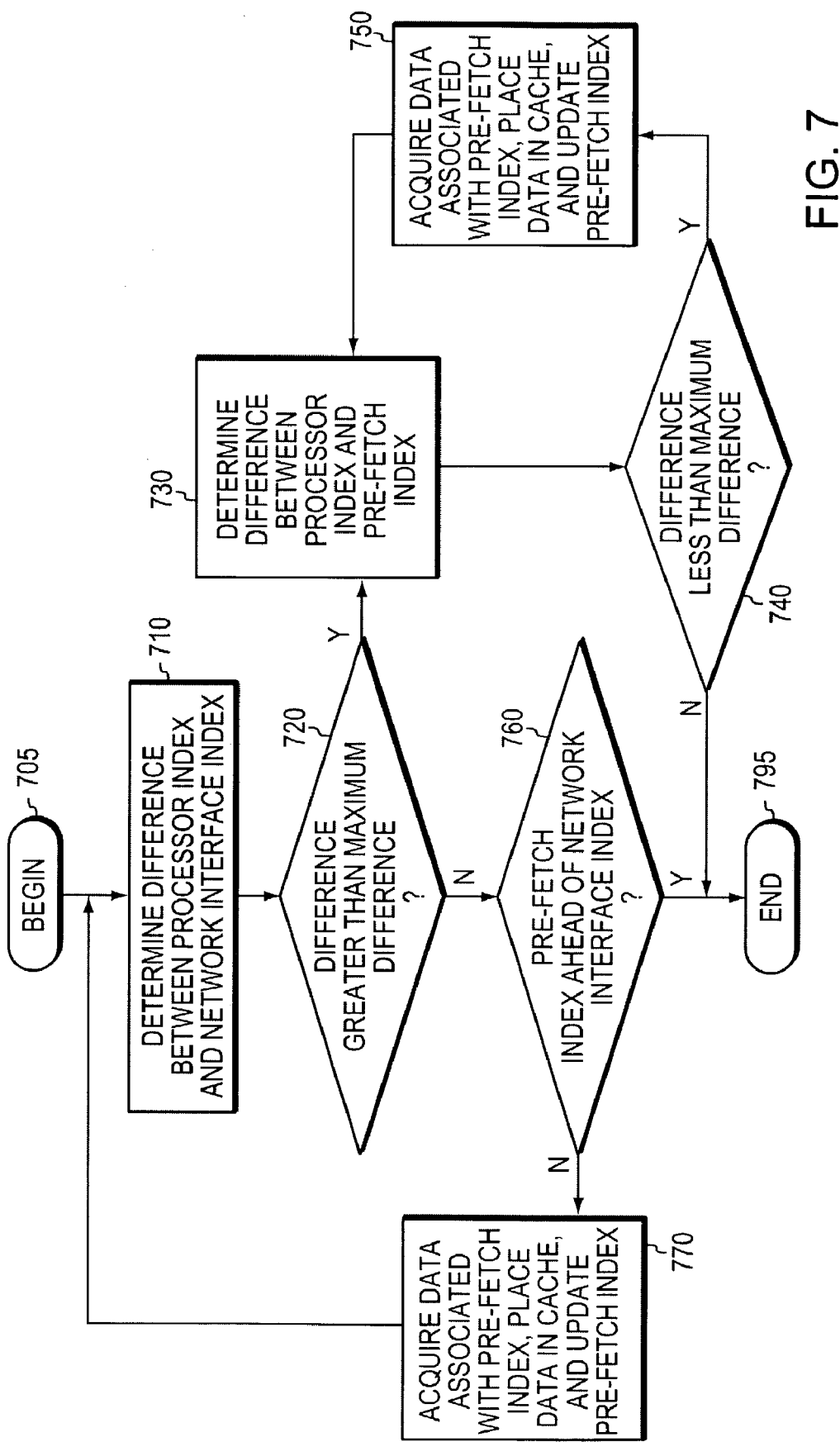
FIG. 7 is a flow diagram of a sequence of steps that may be advantageously used to pre-fetch data and place the data in a cache memory in accordance with the present invention.

In accordance with the inventive technique, if the processor 331 is lagging in processing acquired packets, the pre-fetch logic 370 pre-fetches data associated with packets contained in the packet memory 320 and places the data in the cache memory 334, without involving the processor 331. Specifically, if the number of unprocessed packets is greater than the maximum difference 565, the pre-fetch logic 370 pre-fetches packets up to the maximum difference 565 number of packets ahead of the packet processed by the processor 331. If the number of unprocessed packets is not greater than the maximum difference 565, the pre-fetch logic 370 pre-fetches packets up to the number of packets acquired by the network interface 350. FIG. 7 is a flow diagram of a sequence of steps that may be used to pre-fetch data in accordance with the inventive technique. The sequence begins at Step 705 and proceeds to Step 710 where pre-fetch state machine 376 determines the difference between the contents of the processor index 545 and network interface index 550 registers. As noted above, this difference illustratively represents the number of unprocessed packets acquired by the network interface 350. At Step 720, the difference is compared with the maximum difference 565, and if the difference is not greater than the maximum difference 565, the sequence proceeds to Step 760. At Step 760, the pre-fetch state machine 376 determines if the pre-fetch index 555 points to a descriptor 400 in the receive descriptor ring 364 that is ahead of the descriptor 400 in ring 364 pointed to by the network interface index 550. If so, the sequence proceeds to Step 795 where the sequence ends. Otherwise, the sequence proceeds to Step 770 where data from the packet associated with the descriptor entry 400 accessed (indexed) by the pre-fetch index 555 are acquired from the packet memory 320 and placed in the cache 334. Specifically, the pre-fetch logic 370 accesses the entry 400 in the read descriptor ring 364 that is indexed by the pre-fetch index 555. The pre-fetch logic 370 then issues commands to the cache memory 334 to pre-fetch data from the packet memory 320 at the address represented by the accessed entry's buffer address 450 and place the data in the cache memory 334. The pre-fetch index register 555 is then updated to contain the index of the next descriptor 400 in the read descriptor ring 364 and the sequence returns to Step 710.

At Step 720, if the difference between the network interface index 550 and the processor index 545 is greater than the maximum difference, the sequence proceeds to Step 730 where the pre-fetch state machine 376 determines the difference between the processor index 545 and pre-fetch index 555. At Step 740, if the difference is less than the maximum difference 565, the sequence proceeds to Step 795 where the sequence ends. Otherwise, the sequence proceeds to Step 750 where data from the packet associated with the descriptor entry 400 indexed (accessed) by the pre-fetch index 555 are acquired from the packet memory 320 and placed in the cache 334, in a manner as described above. The pre-fetch index register 555 is then updated to contain the index of the next descriptor in the read descriptor ring 364 and the sequence returns to Step 730.

Figure 8:
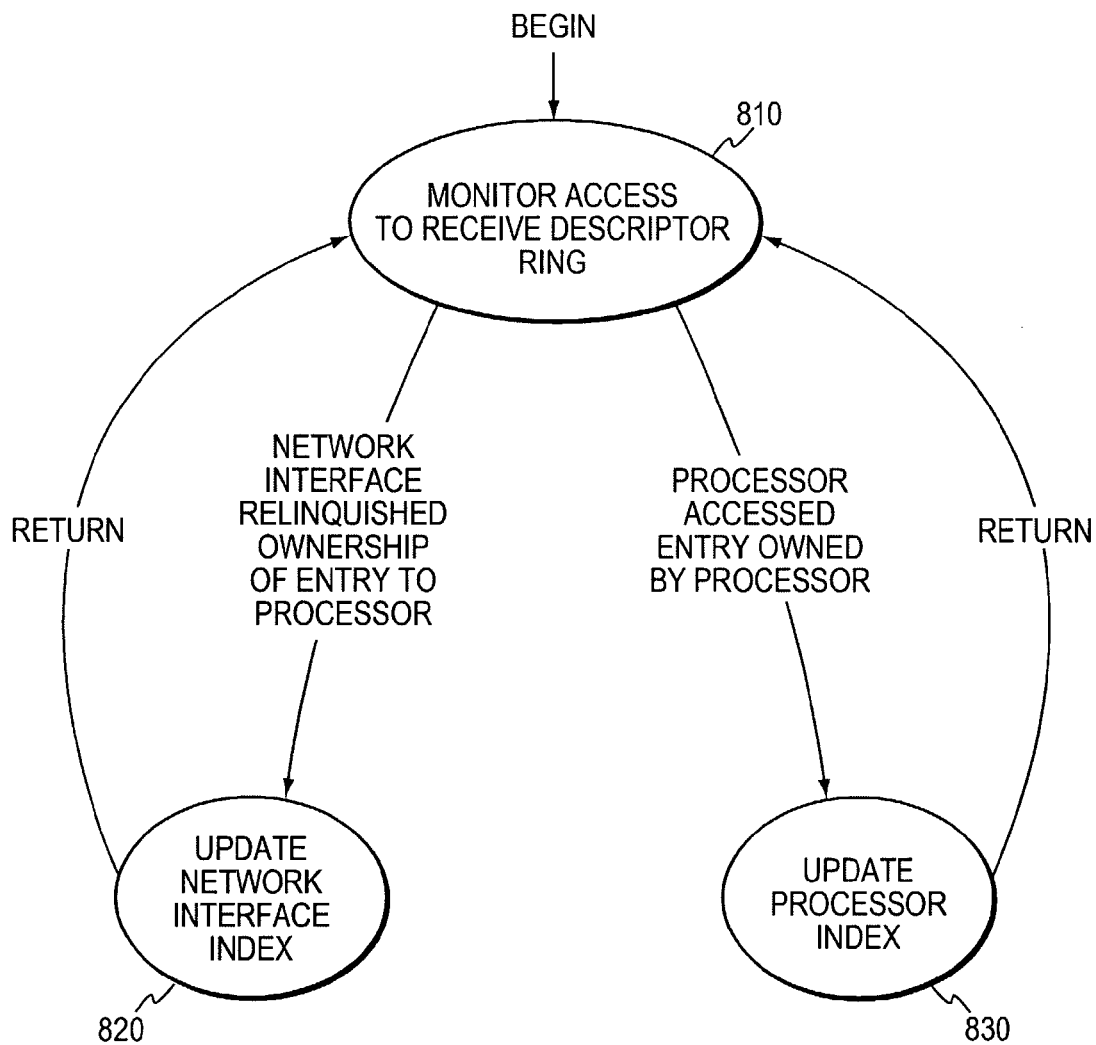
FIG. 8 is a state diagram that may be advantageously used to configure a state machine to update a network interface index and processor index associated with pre-fetching data in accordance with the present invention.
Figure 9:
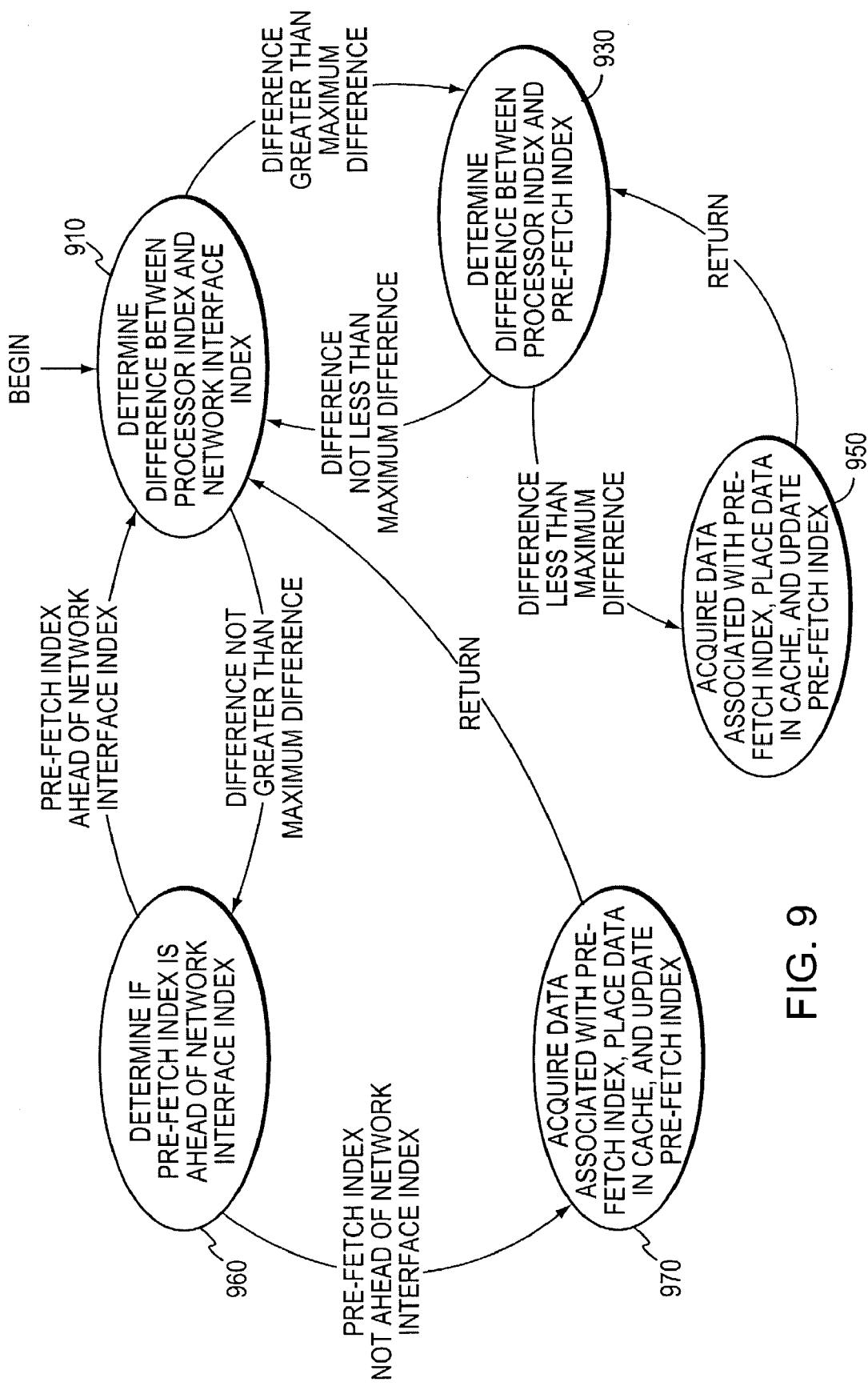
FIG. 9 is a state diagram that may be advantageously used to configure a state machine to pre-fetch data and place the data in a cache memory in accordance with the present invention.

FIGS. 8 and 9 are state diagrams that may be used to configure state machines 374 and 376, respectively, to operate in accordance with the present invention. Referring to FIG. 8, state machine 374 begins in a "monitor access to receive descriptor ring" state 810 where it monitors the SoC bus 310, as described above, to determine if the receive descriptor ring 364 has been accessed. If so, if the ring 364 has been accessed by the network interface 350 and it has changed the ownership bit of an entry 400 in the ring 364 to indicate the processor 331 owns the entry 400 (i.e., has relinquished ownership of the entry 400 to the processor 331) the state machine 374 transitions to an "update network interface index" state 820 where the content of the network interface index register 550 is updated, as described above. The state machine 374 then transitions to the "monitor access to receive descriptor ring" state 810.

If the state machine 374 detects the processor 331 has accessed (e.g., read) an entry 400 owned by the processor 331 in the ring 364, the state machine 374 transitions from state 810 to the "update processor index" state 830. At state 830, the state machine 374 updates the processor index register's content 545, as described above, then returns to the "monitor access to receive descriptor ring" state 810.

Referring to FIG. 9, state machine 376 begins in a "determine difference between processor index and network interface index" state 910 where state machine 376 determines the difference between the processor index 545 and network interface index 550, as described above. If this difference is greater than maximum difference 565, the state machine 376 transitions to the "determine difference between processor index and pre-fetch index" state 930 where the state machine 376 determines the difference between the processor index 545 and pre-fetch index 555. If this difference is not less than the maximum difference 565, the state machine 376 returns to state 910. Otherwise, if this difference is less than the maximum difference 565, the state machine 376 transitions to the "acquire data associated with pre-fetch index, place data in cache, and update pre-fetch index" state 950 where the state machine 376 acquires data associated with the packet indexed by the pre-fetch index 555, places the data in the cache 334 and updates the pre-fetch index 555, as described above. The state machine 376 then returns to state 930.

At state 910, if the difference between the processor index 545 and the pre-fetch index 555 is not greater than the maximum difference 565, the state machine 376 transitions to the "determine if pre-fetch index is ahead of network interface index" state 960, where the state machine 376 determines if the pre-fetch index 555 is ahead of the network interface index 550, as described above. If so, the state machine 376 transitions to state 910. Otherwise, the state machine 376 transitions to the "acquire data associated with pre-fetch index, place data in cache, and update pre-fetch index" state 970 where it acquires data associated with the packet indexed by the pre-fetch index 555, places the data in the cache 334 and updates the pre-fetch index 555, as described above. The state machine 376 then returns to state 910.

Referring again to FIG. 3, the invalidate logic 380 determines if the processor 331 has finished processing a packet acquired by the network interface 350 and placed in the packet memory 320 (i.e., an acquired packet) and if so, invalidates cache entries associated with the packet. Illustratively, logic 380 determines if the processor has finished processing acquired packets by monitoring access to entries 400 in the transmit descriptor ring 366 associated with the acquired packets and determining if ownership of an entry 400 in the ring 366 has been relinquished by the processor 331 (i.e., the processor 331 has changed the ownership bit 420 of the entry 400 to indicate the network interface 350 owns the entry). If so, the invalidate logic 380 concludes the processor 331 has finished processing the acquired packet associated with the entry 400 and invalidates cache entries in cache memory 334 holding data associated with the packet.

Logic 380 illustratively comprises configuration and control registers 1000, index state machine 384, and invalidate state machine 386. The index state machine 384 and invalidate state machine 386 comprise sequential and combinatorial logic configured to implement conventional state machines. The configuration and control registers 1000 contain logic configured to hold values that configure and control portions of the invalidate logic 380.

Figure 10:
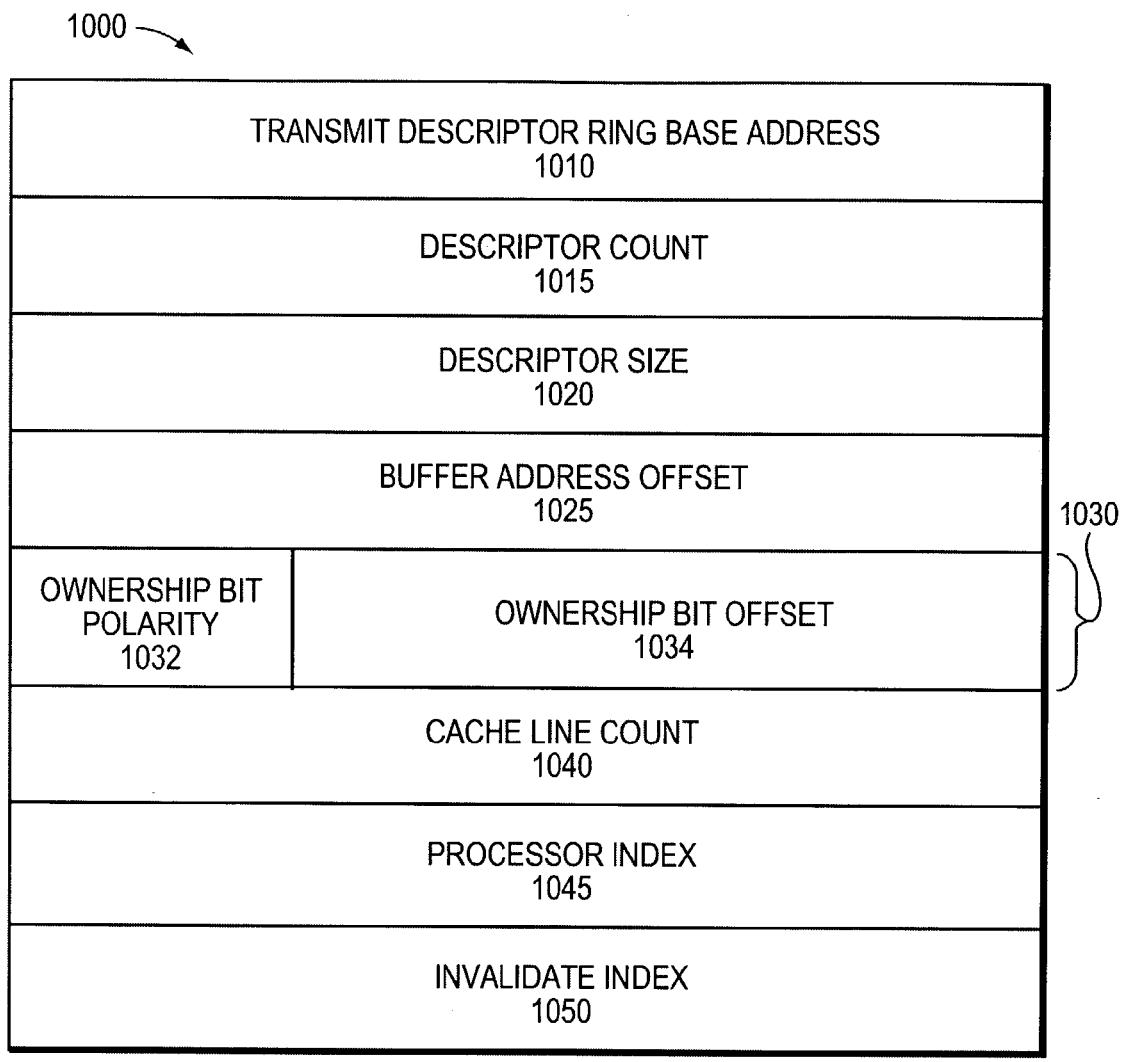
FIG. 10 is a schematic block diagram of configuration and control registers associated with invalidating cache entries that may be advantageously used with the present invention.

FIG. 10 is a schematic block diagram of configuration and control registers 1000 that may be advantageously used with the present invention. The transmit descriptor ring base address register 1010 holds a value that represents the base address of the transmit descriptor ring 366 in the descriptor ring memory 360. The descriptor count 1015 and descriptor size 1020 registers hold values that indicate the number of descriptor entries 400 contained in transmit descriptor ring 366 and the size, illustratively in bytes, of each entry, respectively. The buffer address offset register 1025 holds a value representing a displacement, illustratively in bytes, from the beginning of a transmit descriptor ring entry 400 where the buffer address field 450 begins.

The ownership bit register 1030 contains an ownership bit offset field 1034 and an ownership bit polarity field 1032. The offset field 1034 holds a value that represents an offset, illustratively in bits, from the beginning of an entry 400 in the transmit descriptor ring 366 where the ownership bit field 420 begins. The ownership bit polarity field 1032 holds a value that represents the polarity of the ownership bit 420 as it relates to the processor 331 owning the entry 400. For example, as noted above, the processor 331 owns an entry 400 in the transmit descriptor ring 366 if the ownership bit 420 contained in the entry 400 is set to a zero; thus, the polarity value 1032 is set to indicate a zero.

The cache line count register 1040 holds a value that indicates an amount of data in the cache memory invalidated by the invalidate logic 380. The processor index register 1045 holds an index (processor index) of an entry 400 in the transmit descriptor ring 366 associated with, illustratively, the most recent packet processed by the processor. Likewise, the invalidate index register 1050 holds an index (invalidate index) of, e.g., an entry 400 in the transmit descriptor ring entry 366 accessed by the invalidate logic 380.

Figure 11:
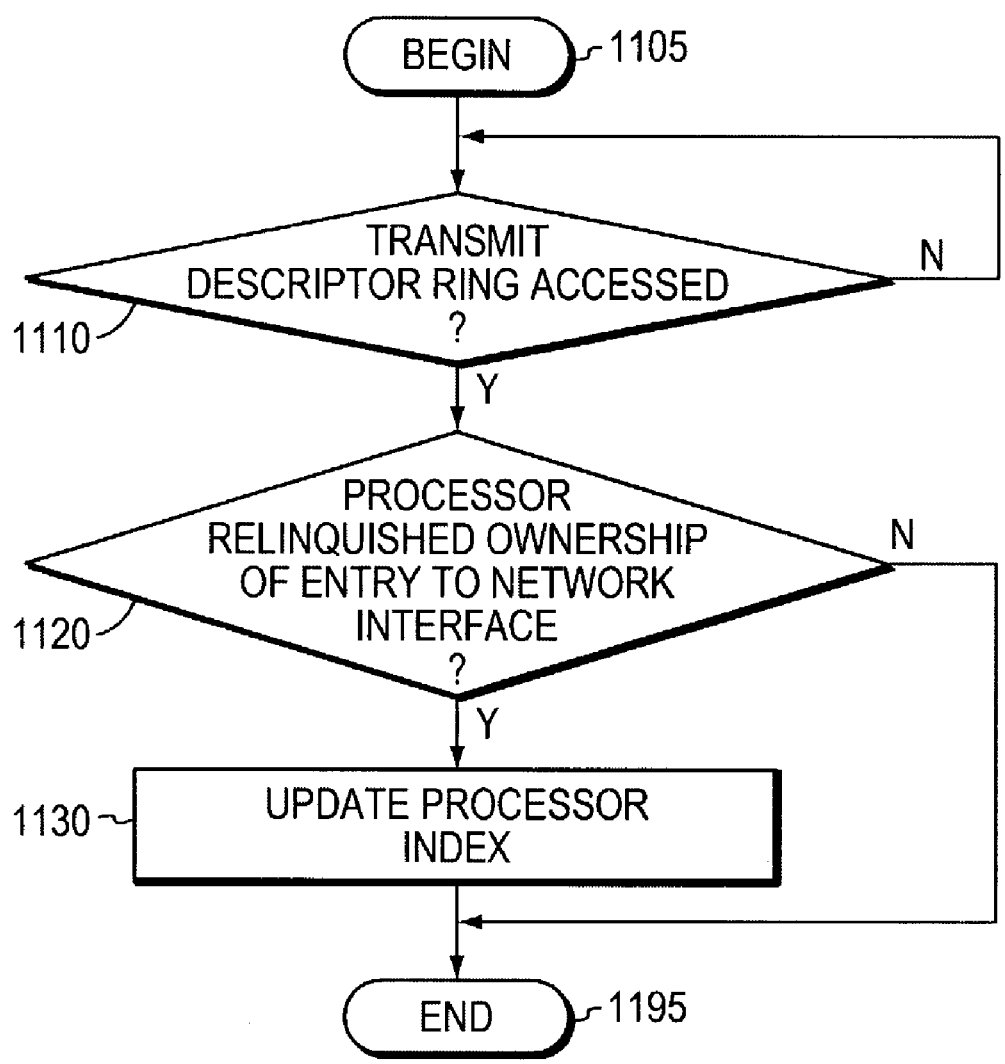
FIG. 11 is a flow diagram of a sequence of steps that may be advantageously used to update a processor index associated with invalidating cache memory entries in accordance with the present invention.

According to the invention, the invalidate logic 380 tracks packets processed by the processor 331 and updates the processor index 1045. FIG. 11 is a flow diagram of a sequence of steps that may be used to update the processor index 1045 in accordance with the inventive technique. The sequence begins at Step 1105 and proceeds to Step 1110 where the index state machine 384 determines if the transmit descriptor ring 366 has been accessed. Specifically, the index state machine 384 monitors bus 310 for write operations to the address space defined by the combination of the transmit descriptor ring base address 1010, the descriptor count 1015 and descriptor size 1020. If the transmit descriptor ring 366 has not been accessed, the sequence returns to Step 1110.

Figure 12:
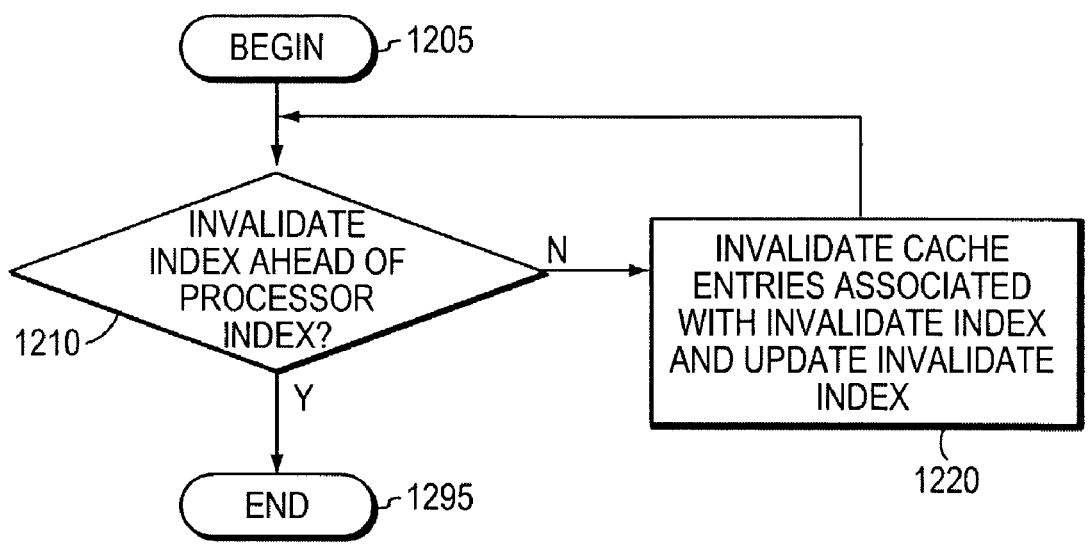
FIG. 12 is a flow diagram of a sequence of steps that may be advantageously used to invalidate cache memory entries in accordance with the present invention.

Otherwise, if the transmit descriptor ring 366 has been accessed by the processor 331, as described above, the sequence proceeds to Step 1120 where the state machine 384 determines if the processor 331 has changed the ownership of an entry 400 in the ring 366 to indicate the network interface 350 owns the entry (i.e., the processor 331 has relinquished ownership of the entry to the network interface 350). Specifically, the invalidate logic 380 extracts an address associated with a write operation and, using the address, the transmit descriptor ring base address 1010, the descriptor size 1020, and ownership bit offset 1034 determines if the processor 331 changed the ownership bit 420 of the entry 400 to indicate the network interface 350 owns the entry (i.e., the processor has relinquished ownership of the entry 400 to the network interface 350). If not, the sequence proceeds to Step 1195 where it ends. Otherwise, the sequence proceeds to Step 1130 where the index state machine 384 updates the content of the processor index register 1045 to contain the index of the entry 400 accessed by the processor 331. As noted above, the invalidate logic 380 invalidates cache memory entries associated with packets processed by the processor 331. Specifically, the invalidate logic 380 monitors access to the transmit descriptor ring 366 and if the processor has relinquished ownership of an entry 400 in the ring 366, the invalidate logic invalidates cache memory entries containing data of the packet associated with the relinquished entry 400. FIG. 12 is a flow diagram of a sequence of steps that may be advantageously used to invalidate a cache memory entry in accordance with the inventive technique. The sequence begins at Step 1205 and proceeds to Step 1210 where the invalidate state machine 386 determines if the descriptor entry 400 in the transmit descriptor ring 366 pointed to by the invalidate index 1050 is ahead of the entry 400 in ring 366 pointed to by the processor index 1045. If so, the sequence ends at Step 1295. Otherwise, the sequence proceeds to Step 1220 where the invalidate state machine 386 invalidates entries in the cache memory 334 holding data of a packet associated with the entry 400 in the transmit descriptor ring 366 accessed (pointed to) by the invalidate index 1050. The content of the invalidate index register 1050 is then updated to contain the index of the next entry 400 in the transmit descriptor ring 366.

Specifically, using the transmit descriptor ring base address 1010, the descriptor size 1020, and the invalidate index 1050, the state machine 386 locates the entry 400 in the transmit descriptor ring 366 associated with the invalidate index 1050. Using the buffer address offset 1025, the state machine 386 locates the buffer address 450 specified in the entry 400. Using the buffer address 450 and cache line count 1040, the state machine 386 determines addresses associated with cache entries in the cache memory 334 that contain data of the packet associated with the entry 400 and invalidates the cache entries by, e.g., issuing commands to the cache memory 334. The invalidate state machine 386 updates the invalidate index register 1050 to contain the index of the next entry 400 in the transmit descriptor ring 366 and returns to Step 1210.

Figure 13:
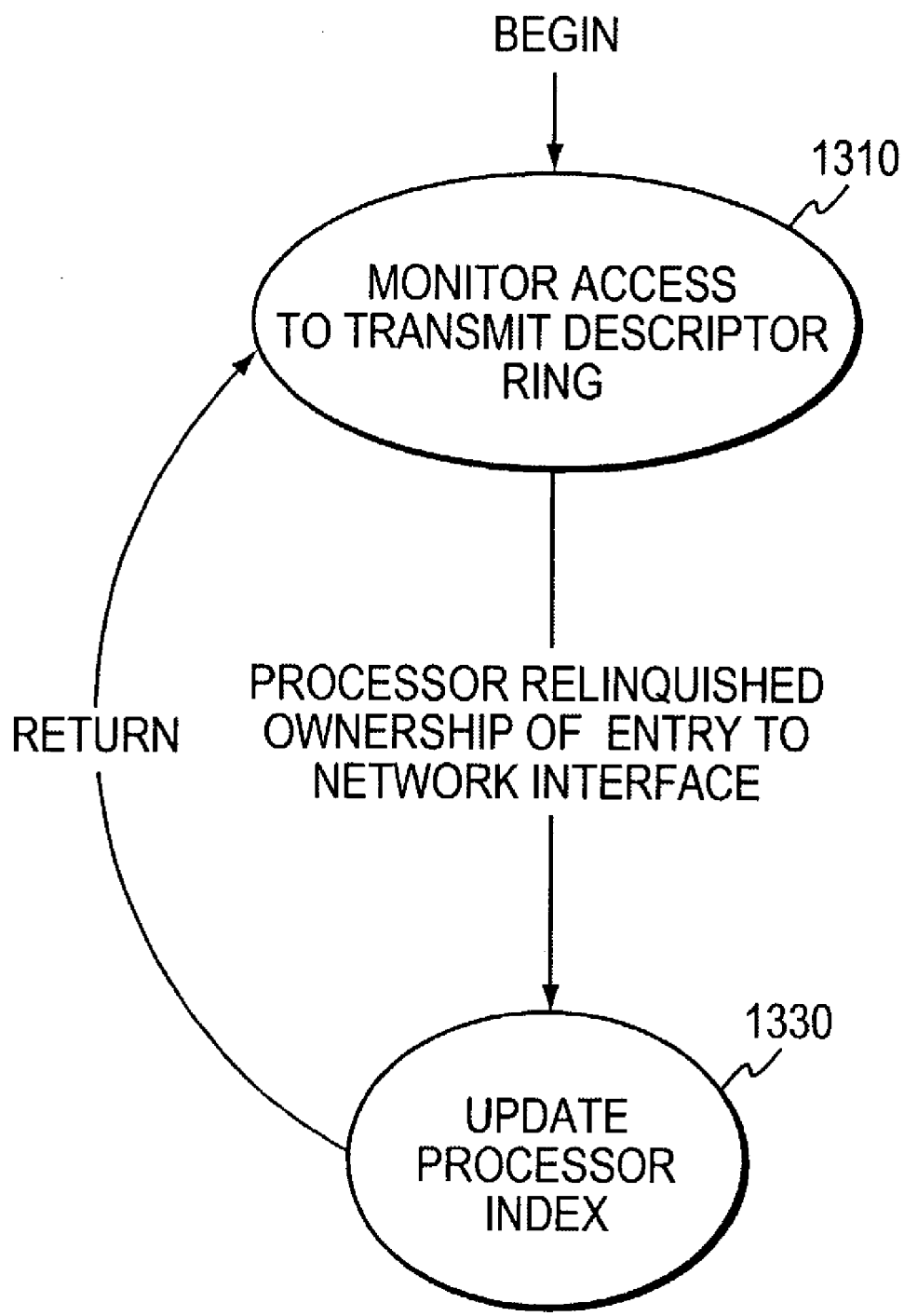
FIG. 13 is a state diagram that may be advantageously used to configure a state machine to update a processor index associated with invalidating cache memory entries in accordance with the present invention.
Figure 14:
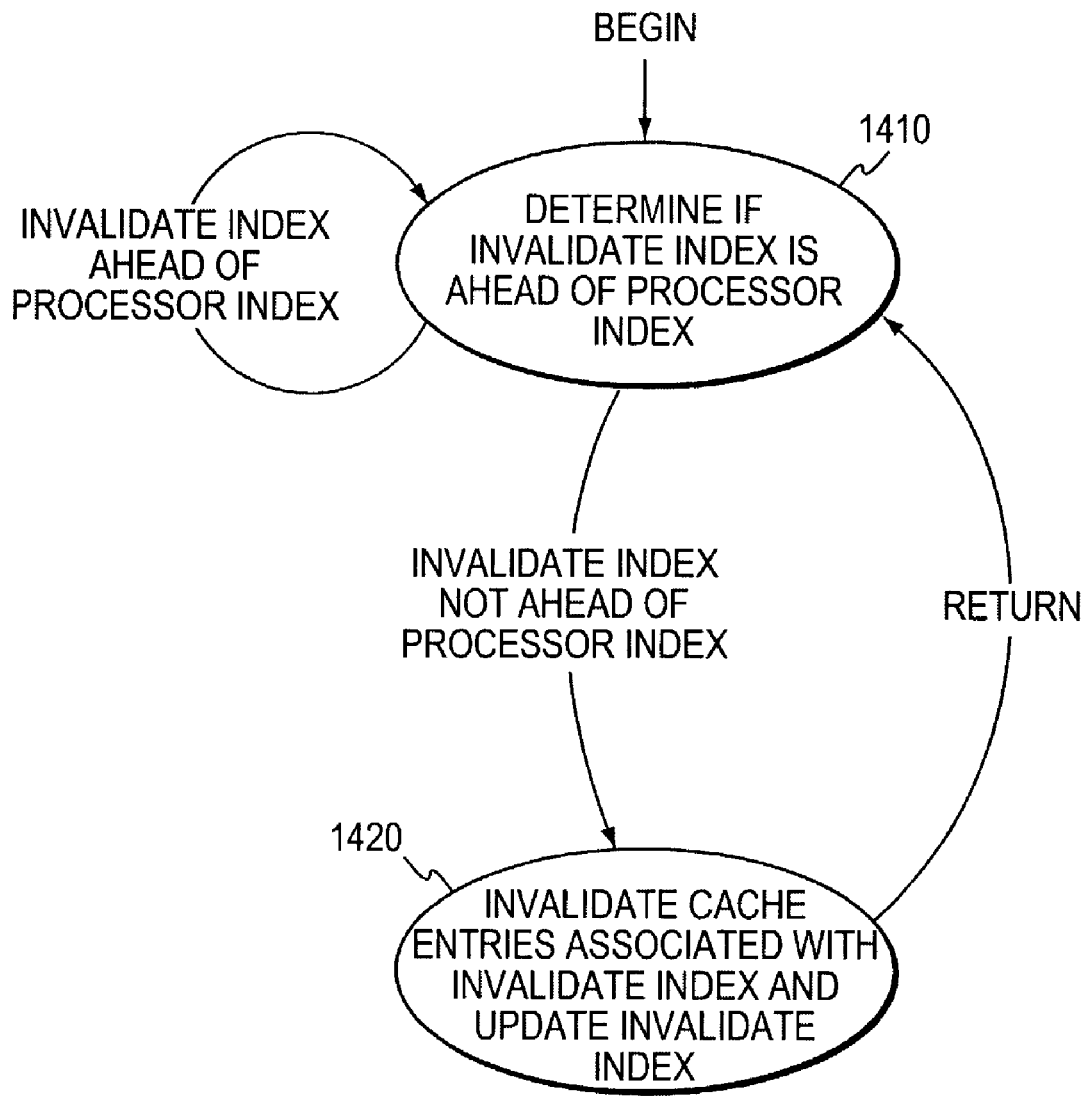
FIG. 14 is a state diagram that may be advantageously used to configure a state machine to invalidate cache memory entries in accordance with the present invention.

FIGS. 13 and 14 are state diagrams that may be advantageously used to configure the index 384 and invalidate 386 state machines, respectively, to operate in accordance with the inventive technique. Referring to FIG. 13 the index state machine 384 begins in an "monitor access to transmit descriptor ring" state 1310 where it monitors access to the transmit descriptor ring 366, as described above. If the processor 331 has relinquished ownership of an entry 400 in ring 366 to the network interface 350, the state machine 384 transitions to an "update processor index" state 1330 where it updates the processor index register's content, as described above. The state machine 384 then returns to state 1310.

Referring to FIG. 14 invalidate state machine 386 begins in a "determine if invalidate index is ahead of processor index" state 1410 where the state machine 386 determines if the invalidate index 1050 is ahead of the processor index 1045, as described above. If so, the sequence stays in state 1410. Otherwise, the state machine 386 transitions to an "invalidate cache entries associated with the invalidate index" state 1420 where it invalidates the cache entries associated with the invalidate index register 1050, as described above. The invalidate state machine 386 then updates the invalidate index, as described above, and returns to state 1410.

Although the above-described embodiment is directed to the use of the inventive technique in a system containing a single network interface and a single set of transmit and receive descriptor rings, this is not intended to be a limitation of the invention. Systems employing multiple network interfaces (devices) with or without a separate set of descriptor rings for each device may take advantage of the invention.

It should also be noted that the above-described inventive technique may be implemented in whole or in part as instructions executable on a computer and contained in a computer-readable medium. For example, the state machines contained in the pre-fetch logic 370 and invalidate logic 380 may be implemented as software routines that perform the various functions associated with the state machines. Moreover, information contained in configuration and control registers 500 and 1000 may be implemented as data structures accessible to the software routines.

It should be further noted that in the above-described embodiment of the invention, data associated with acquired packets are pre-fetched and placed in the cache memory up to the number of unprocessed packets indicated by the maximum difference value, however, this is not intended to be a limitation of the invention. Rather in other embodiments of the invention, data associated with unprocessed packets are pre-fetched and placed in the cache memory up to the number of unprocessed packets.

Additionally, for purposes of illustration, the above-described embodiment of the invention describes the inventive technique as applied to packets associated with single descriptor entries. However, one skilled in the art would know that the above invention may be readily adapted to work with packets that are associated with multiple descriptor entries. In a typical arrangement where a packet is associated with multiple descriptor entries, the status bits 430 contain a "start of packet" (SOP) field that indicates a starting descriptor associated with the beginning of the packet and an "end of packet" (EOP) field that indicates an ending descriptor associated with the end of the packet. The packet is typically associated with all the descriptors from the starting to the ending descriptor. For example, for a particular packet if the starting descriptor is the second descriptor in the ring and the ending descriptor is the fifth descriptor in the ring, the packet would be associated with the second, third, fourth, and fifth descriptors in the ring. One skilled in the art would know that in such an arrangement, the status bits 430 in the descriptor 400 entries would have to be examined to determine which descriptors 400 are associated with a particular packet. Thus, the status bits would have to be taken into consideration when e.g., determining the difference in the number of packets processed by the processor and the network interface, pre-fetching data associated with the packets, updating the processor, network, pre-fetch, and invalidate indices, and so on.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. In an intermediate node coupled to a network and containing a processor coupled to a cache memory and an external memory, the external memory containing one or more packets acquired by the intermediate node, a method for managing the cache memory comprising the steps of:
   determining, without the processor's intervention, if the processor is lagging in processing packets acquired by the intermediate node;
   if the processor is lagging in processing packets acquired by the intermediate node, pre-fetching, without the processor's intervention, data associated with unprocessed acquired packets from the external memory and placing the data in the cache memory;
   determining, without the processor's intervention, if the processor has completed processing an acquired packet; and
   if the processor has completed processing the acquired packet, invalidating, without the processor's intervention, one or more cache entries holding data associated with the processed acquired packet.

2. In an intermediate node coupled to a network and containing a processor coupled to a cache memory and an external memory, the external memory containing one or more packets acquired by the intermediate node, a method for managing the cache memory comprising the steps of:
   determining, without the processor's intervention, if the processor is lagging in processing packets acquired by the intermediate node;
   if the processor is lagging in processing packets acquired by the intermediate node, pre-fetching, without the processor's intervention, data associated with unprocessed acquired packets from the external memory and placing the data in the cache memory;
   determining, without the processor's intervention, if a number of unprocessed acquired packets is greater than a maximum number; and
   if the number of unprocessed acquired packets is greater than the maximum number, pre-fetching packets up to the maximum number of unprocessed acquired packets.

3. A method as defined in claim 2 comprising the steps of:
   determining, without the processor's intervention, if a number of unprocessed acquired packets is greater than a maximum number; and
   if not, pre-fetching packets up to the number of packets acquired by the intermediate node.

4. A method as defined in claim 2 wherein the intermediate node comprises a network interface coupled to the network.

5. A method as defined in claim 4 wherein the intermediate node comprises a receive descriptor ring containing a plurality of entries wherein each entry is accessible by an index and contains an indicator that indicates ownership of the entry.

6. A method as defined in claim 5 wherein the intermediate node comprises a network interface index and a processor index.

7. A method as defined in claim 6 comprising the steps of:
   determining if the network interface has relinquished ownership of an entry in the receive descriptor ring to the processor; and
   if so, updating the network interface index to the index of the entry.

8. A method as defined in claim 6 comprising the steps of:
   determining if the processor has accessed an entry in the receive descriptor ring; and
   if so, updating the processor index to the index of the entry.

9. A method as defined in claim 6 wherein the intermediate node contains a pre-fetch index.

10. A method as defined in claim 9 comprising the steps of:
    determining if a number of unprocessed acquired packets is greater than a maximum number;
    if the number is greater than the maximum number, determining if a difference between the processor index and the pre-fetch index is less than the maximum number; and if the difference is less than the maximum number, acquiring data from the external memory, at an address associated with a buffer address contained in an entry in the read descriptor ring accessed by the pre-fetch index, and placing the acquired data in the cache memory.

11. A method as defined in claim 9 comprising the steps of:
determining if a number of unprocessed acquired packets is greater than a maximum number; and
if not, acquiring data from the external memory associated with an unprocessed acquired packet, at an address associated with a buffer address contained in an entry in the read descriptor ring accessed by the pre-fetch index, and placing the acquired data in the cache memory.

12. In an intermediate node coupled to a network and containing a processor coupled to a cache memory comprising one or more cache entries configured to hold data associated with packets acquired by the intermediate node, a method for managing the cache memory comprising the steps of:
determining, without the processor's intervention, if the processor has completed processing an acquired packet; and
if so, invalidating, without the processor's intervention, one or more cache entries holding data associated with the processed acquired packet.

13. A method as defined in claim 12 wherein the intermediate node comprises a processor index and a transmit descriptor ring containing a plurality of entries wherein each entry is accessible by an index and contains an indicator that indicates ownership of the entry.

14. A method as defined in claim 13 comprising the steps of:
determining if the processor has relinquished ownership of an entry in the transmit descriptor ring; and
if so, updating the processor index to the index of the relinquished entry.

15. A method as defined in claim 13 wherein the intermediate node contains an invalidate index.

16. A method as defined in claim 15 comprising the steps of:
determining if the invalidate index points to a processed acquired packet; and
if so, invalidating cache entries holding data contained in a packet pointed to by the invalidate index.

17. A method as defined in claim 15 comprising the step of:
updating the invalidate index to the index of the next entry in the transmit descriptor ring.

18. An intermediate node coupled to a network, the node comprising:
an external memory configured to hold packets acquired from the network;
a processor configured to process the acquired packets;
a cache memory coupled to the processor and containing one or more cache entries configured to hold data associated with the acquired packets;
pre-fetch logic coupled to the cache memory, the pre-fetch logic configured to pre-fetch, without the processor's intervention, data associated with unprocessed acquired packets from the external memory and place the data in the cache memory; and
invalidate logic coupled to the cache memory, the invalidate logic configured to, without the processor's intervention, determine if the processor has completed processing an acquired packet and, if so, invalidate one or more cache entries holding data associated with the processed acquired packet.

19. An intermediate node coupled to a network, the node comprising:
an external memory configured to hold packets acquired from the network;
a processor configured to process the acquired packets;
a cache memory coupled to the processor and configured to hold data associated with the acquired packets; and
pre-fetch logic coupled to the cache memory, the pre-fetch logic configured to pre-fetch, without the processor's intervention, data associated with unprocessed acquired packets from the external memory and place the data in the cache memory, the pre-fetch logic further configured to determine if a number of unprocessed acquired packets is greater than a maximum number and if so, pre-fetch packets up to the maximum number of unprocessed acquired packets.

20. An intermediate node as defined in claim 19 wherein the pre-fetch logic is configured to determine if a number of unprocessed acquired packets is greater than a maximum number and if not, pre-fetch packets up to the number of packets acquired by the intermediate node.

21. An intermediate node as defined in claim 19 comprising:
a network interface configured to acquire packets from the network and place the packets in the external memory.

22. An intermediate node as defined in claim 21 comprising:
a receive descriptor ring comprising one or more entries wherein each entry is accessible by an index and contains an indicator that indicates ownership of the entry;
a network interface index that indicates an entry in the receive descriptor ring accessed by the network interface; and
a processor index that indicates an entry in the receive descriptor ring accessed by the processor.

23. An intermediate node as defined in claim 22 wherein the pre-fetch logic is configured to determine if the network interface has relinquished ownership of an entry in the receive descriptor ring to the processor and if so, update the network interface index to the index of the entry.

24. An intermediate node as defined in claim 22 wherein the pre-fetch logic is configured to determine if the processor has accessed an entry in the receive descriptor ring and if so, update the processor index to the index of the entry.

25. An intermediate node as defined in claim 22 wherein the pre-fetch logic is configured to determine if a difference between the processor index and the network interface index is greater than a maximum difference and if so, pre-fetch packets up to the maximum number of unprocessed acquired packets.

26. An intermediate node as defined in claim 22 wherein the pre-fetch logic is configured to determine if a difference between the processor index and the network interface index is greater than a maximum difference and if not, pre-fetch packets up to the number of packets acquired by the intermediate node.

27. An intermediate node as defined in claim 22 comprising:
a pre-fetch index that indicates an entry in the receive descriptor ring accessed by the pre-fetch logic.

28. An intermediate node as defined in claim 27 wherein the pre-fetch logic is configured to determine if a difference between the processor index and the network interface index is greater than a maximum difference, if not, acquire data from the external memory associated with an unprocessed acquired packet at an address associated with a buffer address contained in an entry in the read descriptor ring accessed by the pre-fetch index and place the acquired data in the cache memory.

29. An intermediate node as defined in claim 27 wherein the pre-fetch logic is configured to determine if a difference between the processor index and the network interface index is greater than a maximum difference, if so, determine if a difference between the processor index and the pre-fetch index is less than the maximum difference and if so, acquire data from the external memory at an address associated with a buffer address contained in an entry in the read descriptor ring accessed by the pre-fetch index and place the acquired data in the cache memory.

30. An intermediate node coupled to a network, the node comprising:
   an external memory configured to hold packets acquired from the network;
   a processor configured to access the external memory and process the acquired packets;
   a cache memory coupled to the processor and containing one or more cache entries configured to hold data associated with the acquired packets; and
   invalidate logic coupled to the cache memory and configured to, without the processor's intervention, determine if the processor has completed processing an acquired packet and if so, invalidate one or more cache entries holding data associated with the processed acquired packet.

31. An intermediate node as defined in claim 30 comprising:
   a transmit descriptor ring containing a plurality of entries wherein each entry is accessible by an index and contains an indicator that indicates ownership of the entry; and
   a processor index that indicates an entry in the transmit descriptor ring accessed by the processor.

32. An intermediate node as defined in claim 30 wherein the invalidate logic is configured to determine if the processor has relinquished ownership of an entry in the transmit descriptor ring and if so, update the processor index to the index of the entry.

33. An intermediate node as defined in claim 30 comprising:
   an invalidate index that indicates an entry in the transmit descriptor ring accessed by the invalidate logic.

34. An intermediate node as defined in claim 33 wherein the invalidate logic is configured to determine if the invalidate index points to a processed acquired packet and if so, invalidate cache entries holding data contained in a packet by the invalidate index.

35. A system coupled to a data network comprising:
   a cache memory comprising one or more cache entries;
   a processor coupled to the cache memory;
   an external memory accessible to the processor, the external memory configured to hold packets acquired from the network;
   means for determining, without the processor's intervention, if the processor is lagging in processing the acquired packets;
   means for pre-fetching, if the processor is lagging in processing the acquired packets, without the processor's intervention, data associated with unprocessed acquired packets from the external memory and placing the data in the cache memory;
   means for determining, without the processor's intervention, if the processor has completed processing an acquired packet; and
   means for invalidating, if the processor has completed processing the acquired packet, without the processor's intervention, entries in the cache memory associated with the acquired packet that has been processed completely.

36. A system coupled to a network comprising:
   a cache memory;
   a processor coupled to the cache memory;
   an external memory accessible by the processor, the external memory configured to hold packets acquired from the network;
   means for determining, without the processor's intervention, if the processor is lagging in processing the acquired packets;
   means for pre-fetching, without the processor's intervention, data associated with unprocessed acquired packets from the external memory and placing the data in the cache memory;
   means for determining, without the processor's intervention, if a number of unprocessed acquired packets is greater than a maximum number; and
   means for pre-fetching packets up to the maximum number of unprocessed acquired packets if the number of unprocessed packets is greater than the maximum number.

37. A method as defined in claim 36 comprising the steps of:
   means for determining, without the processor's intervention, if a number of unprocessed acquired packets is greater than a maximum number; and
   means for pre-fetching packets up to the number of packets acquired by the intermediate node if the number of unprocessed packets is not greater than the maximum number.

38. A system coupled to a network comprising:
   a cache memory comprising one or more cache entries;
   a processor coupled to the cache memory;
   an external memory accessible to the processor, the external memory configured to hold packets acquired from the network;
   means for determining, without the processor's intervention, if the processor has completed processing an acquired packet; and
   means for invalidating, if the processor has completed processing the acquired packet, without the processor's intervention, entries in the cache memory associated with the acquired packet that has been processed completely.

39. A computer readable medium comprising computer executable instructions for execution in a first processor, the medium comprising instructions for:
   determining, without a second processor's intervention, if the second processor has completed processing an acquired packet; and
   if so, invalidating, without the second processor's intervention, one or more cache entries holding data associated with the processed acquired packet, wherein the cache entries are comprised within a cache memory coupled to the second processor.

* * * * *